(12) United States Patent
Mitchell et al.

(10) Patent No.: US 7,178,131 B2
(45) Date of Patent: Feb. 13, 2007

(54) INSPECTING THE RUNTIME BEHAVIOR OF A PROGRAM WHILE MINIMIZING PERTURBATION

(75) Inventors: Nick M. Mitchell, White Plains, NY (US); Gary Sevitsky, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 10/673,838

(22) Filed: Sep. 29, 2003

(65) Prior Publication Data

US 2005/0071815 A1    Mar. 31, 2005

(51) Int. Cl.
G06F 9/44 (2006.01)
(52) U.S. Cl. .................................. 717/124; 717/127
(58) Field of Classification Search ................ 717/124, 717/125, 126, 127
See application file for complete search history.

(56) References Cited

U.S. PATENT DOCUMENTS

| | | | |
|---|---|---|---|
| 5,450,586 A * | 9/1995 | Kuzara et al. | 717/124 |
| 5,748,878 A * | 5/1998 | Rees et al. | 714/38 |
| 5,758,061 A * | 5/1998 | Plum | 714/35 |
| 5,940,618 A * | 8/1999 | Blandy et al. | 717/128 |
| 5,960,198 A * | 9/1999 | Roediger et al. | 717/130 |
| 6,079,032 A * | 6/2000 | Peri | 714/38 |
| 6,085,029 A * | 7/2000 | Kolawa et al. | 714/38 |
| 6,161,200 A * | 12/2000 | Rees et al. | 714/38 |
| 6,189,141 B1 * | 2/2001 | Benitez et al. | 717/153 |
| 6,298,477 B1 * | 10/2001 | Kessler | 717/145 |
| 6,311,327 B1 * | 10/2001 | O'Brien et al. | 717/114 |
| 6,341,357 B1 * | 1/2002 | Ravichandran | 714/38 |
| 6,397,379 B1 * | 5/2002 | Yates et al. | 717/140 |
| 6,397,382 B1 * | 5/2002 | Dawson | 717/130 |
| 6,412,107 B1 * | 6/2002 | Cyran et al. | 717/148 |
| 6,455,335 B1 * | 9/2002 | Kohno et al. | 438/14 |
| 6,467,052 B1 * | 10/2002 | Kaler et al. | 714/39 |
| 6,496,575 B1 * | 12/2002 | Vasell et al. | 379/102.05 |
| 6,536,037 B1 * | 3/2003 | Guheen et al. | 717/151 |
| 6,539,539 B1 * | 3/2003 | Larsen et al. | 717/124 |
| 6,615,166 B1 * | 9/2003 | Guheen et al. | 703/27 |
| 6,631,518 B1 * | 10/2003 | Bortnikov et al. | 717/158 |
| 6,658,651 B2 * | 12/2003 | O'Brien et al. | 717/127 |

(Continued)

OTHER PUBLICATIONS

"An Extensible Probe Architecture for Network Protocol Performance Measurement", G. Robert Malan et al, ACM, 1998, pp. 215-227.*

(Continued)

Primary Examiner—Todd Ingberg
(74) Attorney, Agent, or Firm—Michael J. Buchenhorner; Douglas W. Cameron

(57) ABSTRACT

Analyzing the runtime behavior of a program given a set of one or more probes and points for inserting the probes for performing a specified inspection, includes providing a compiler with one or more of the following types of information about each probe: specifying the probe's context, its filter criteria, whether it is a fast-path probe, whether it is a timing probe, the probe's guard swing, the probe's context hardness, and the probe's temporal hardness; and compiling the program with the one or more probes and the information.

21 Claims, 2 Drawing Sheets

U.S. PATENT DOCUMENTS

| | | | |
|---|---|---|---|
| 6,671,876 B1* | 12/2003 | Podowski | 717/130 |
| 6,721,941 B1* | 4/2004 | Morshed et al. | 717/127 |
| 6,728,955 B1* | 4/2004 | Berry et al. | 717/158 |
| 6,732,357 B1* | 5/2004 | Berry et al. | 717/158 |
| 6,754,889 B1* | 6/2004 | Leverenz | 717/127 |
| 6,792,460 B2* | 9/2004 | Oulu et al. | 709/224 |
| 6,918,110 B2* | 7/2005 | Hundt et al. | 717/158 |
| 6,919,110 B2* | 7/2005 | Oketani et al. | 428/32.34 |
| 6,968,547 B2* | 11/2005 | Cantrill | 717/158 |
| 6,996,804 B2* | 2/2006 | Stoodley | 717/116 |
| 7,039,644 B2* | 5/2006 | Hind et al. | 707/101 |
| 7,107,579 B2* | 9/2006 | Tsai et al. | 717/127 |

OTHER PUBLICATIONS

"Fine Grained Dynamic Instrumentation of Commodity Operating System Kernels", Ariel Tamches et al, Third Symposium on Operating Systems Design and Implementation, Feb. 1999, 12 pages.*

Using Dynamic Kernel Instrumentation for Kernel and Application Tuning, Ariel Tamches et al, International Journal of High-Performance and Applications, Mar. 1999, 12 pages.*

Run-Time Monitoring of Real-Time Systems, Sarah E. Chodrow et al, 1991, pp. 74-83.*

IBM Technical Bulletin, vol. 34, No. 7B Dec. 1991, Tailorable Embedded Event Trace, pp. 259-261.*

Multiprocessor Performance Measurement Instrumentation, Alan Mink et al, National Institute of Standards and Technology, 1990, pp. 256-268.*

Automatic Insertion of Performance Instrumentation for Distributed Applications, Sarr Blumson et al, Feb. 1995, pp. 3-23.*

IDebug: An Advanced Debugging Framework for Java, Joseph R. Kiniry, Sep. 1998, pp. 1-11.*

ATOM: A System for Building Customized Program Analysis Tools, Amitabh Srivastava et al, pp. 528-539 , 1994.*

* cited by examiner

INSPECTING THE RUNTIME BEHAVIOR OF A PROGRAM WHILE MINIMIZING PERTURBATION

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information processing technology, and more particularly relates to the field of inspecting the runtime performance of a program.

BACKGROUND OF THE INVENTION

Instrumentation is a technique that inserts probes in a running program to collect runtime information. Many situations require an analysis of the runtime behavior of a program. For example, a programmer may need to diagnose why certain transaction types in a server run slowly, while others have acceptable performance. In these situations, we diagnose performance or correctness problems in the program's code that only become apparent when studying the program as it runs. In other scenarios, a separate agent must verify whether certain dynamic conditions hold, such as when an optimizing compiler specializes the code depending on how many times a method in the program is invoked on a given input.

One increasingly common reason why problems can best be addressed by analyzing runtime behavior is the heavy reliance on application frameworks (generic applications that display windows and that support copy and paste and other such functions that can be used to write code). When using these application frameworks, such as IBM WebSphere application server, or the Eclipse integrated development environment, a large component of the program's behavior is data or time-dependent. In addition, its behavior is hidden under layers of code to which either the programmer has no access, or whose semantics are poorly documented. For these reasons, programs that use frameworks tend to exhibit runtime behavior that is difficult to predict by only inspecting the application's code.

To analyze dynamic behavior requires inspecting the running program at certain intervals. Each inspection either verifies, aggregates, or records some aspect of the state of the program's runtime at that point in time. For example, an inspection can count how many times the program invokes certain methods or allocates certain types of objects. Another kind of inspection records the details of such invocations or allocations. By "record" we mean to write information to some stable storage at the time of the inspection. The interval at which this inspecting occurs depends on the analysis task. An important criterion of the instrumented program is the perturbation caused as a result of inserting the desired set of probes. This perturbation takes on a number of forms. First and most generally, the instrumented program may run slower than the original program. Second, objects may be allocated that were not in the original program. Third, the compiler may optimize the program in a substantially different way in the presence of probes. For example, the compiler may inline methods when compiling the original program that it does not when compiling the instrumented program. This difference in optimization not only affects the performance of the instrumented program, but may also result in probe output which is merely an artifact of the perturbed optimizations; e.g. if a tool user desires to record invocations only of non-inlined methods, but the probes block the optimizer from inlining, then the probes will record artifactual information.

Low perturbation is of the utmost importance, because it allows runtime inspection of the state of systems where performance and lack of artifacts is critical. For example, in order to diagnose problems on systems that have already been deployed into the field, the analysis must not cause a noticeable degradation of the service level which would otherwise be provided. If such an analysis of a deployed e-commerce application slows down response time of transactions by 50%, the owner of the system will be unhappy: the tool has severely degraded the level of service provided to the owner's customers. However, there is a more serious issue of polluting the quality of information obtained by the analysis: slowdowns of factors of two or more are even worse, because they may result in failures of otherwise well behaving transactions.

This degree of perturbation depends on the how many probes are inserted, what each probe does, how each is implemented, and how each is treated by the compiler or underlying runtime system. This document considers the combination of factors which lead to a very high perturbation, and presents a technique which, for that common combination factors, yields much lower perturbation.

Factors Which Lead to High Perturbation

The reasons a set of probes highly perturbs a program run are either due to poor probe choice and implementation, or due to lack of support for lightweight probes. The former lead to an unavoidable perturbation when running the instrumented program: if a tool uses probes that are frequently executed or probes whose execution is expensive, then the eventual outcome is a highly perturbed run. For example, a tool might insert a probe which performs a lengthy computation for every object allocation in the program; the HPROF Java profiler from Sun Microsystems does just this, and slows down the program by a factor of five or more. Poor choice of probe implementation is not discussed. We discusses three scenarios of perturbation that result from poor support for well implemented probes: possibly irrelevant probes, dynamically conditioned probes, and probes which rely on operations outside of the source language's purview (e.g. native code in Java)—we call the latter, native probes.

Possibly Irrelevant Probes

A tool inserts a set of probes into the program code to perform an inspection of the program's dynamic behavior. Certain inspection tasks only make sense while the instrumented program code remains largely similar to its state when the instrumentation occurred. However, the program may be transformed (with code removed, added, or reordered) by a static compiler or the underlying runtime (e.g., a just in time compiler, dynamic optimizer, virtual machine, operating system, or hardware). If these transformations involve the inspection points, there can be complications. First, removing an event (e.g. the invocation of a particular method via inlining) may not remove the probe, which was inserted to track that invocation; thus, we are left with a residual: an orphaned probe which is unnecessary perturbation, and is recording events that no longer occur in the transformation program. Second, the presence of a probe may block an optimization which would have otherwise removed that inspection point.

Similarly, if the optimizer can inline a method invocation, and the tool wishes to track that invocation, the probe may no longer be necessary. In both cases, whether the probe, is truly necessary or not is finally up to the tool who created the probes.

Dynamically Conditioned Probes

Certain inspection tasks require many probes to be inserted. We distinguish between inserting many probes to track every occurrence of some activity from inserting many probes in order to track a subset of occurrences of any kind. For example, a tool user may wish to record the time at which any method in the original program code is invoked. This was categorized as a poor choice of probe implementation, because it will inevitably lead to a highly perturbed run. We desire an arbitrarily large set of probes to be inserted, so long as the probes are, in aggregate, infrequently executed. For example, recording the time of every invocation for one transaction, and in one thread, is often a small fraction of all invocations in an e-commerce server under load.

However, implementing dynamically conditioned probes that do not perturb program runs is challenging. Consider two alternative ways to implement conditioned probes. The first strategy relies on recompilation. It adds no logic, and instead recompiles the method every time a condition, such as when the compiler specializes the instrumented program code depending on how many times a method in the original program is invoked, changes. At compile time, it evaluates the conditions and, if any of the conditions are false, it generates the code which executes the probe. There are two downsides to this technique. First, not all conditions can be compiled into the executable program code. For example, some conditions may be based on dynamic, flow sensitive criteria, such as the identity of the invoking thread. Second, the overhead of recompiling in order to reevaluate conditions may result in a very high perturbation. For example, a probe which records method invocation activity can be enabled or disabled. However, changing from one state to the other would entail recompiling every method in the program.

The second implementation strategy adds logic to the program code itself which performs the checks dynamically, each time the probe is executed. The downside of this approach is that the perturbation caused by checking the conditions may be high. For example, a probe is conditioned on the current thread cannot be implemented efficiently at the Java programming language level. Doing so would entail the time expense of hash table lookups, but also would also perturb the object space in creating objects solely for the purpose of implementing the dynamic checks. If probes are inserted to record the duration of method invocations, for example, then this strategy would add at least two hash table lookups to each invocation in the program's run (even if most of the time, the condition is false).

Native Probes

When writing Java programs, the programmer has a choice of writing code as java source, as bytecodes, or as native code. To access native code or storage from Java code, and Java code and storage from native code, one uses the Java Native Interface (JNI). The Java virtual machine, in addition to providing the runtime support for garbage collection, storage allocation, thread management, etc., performs the necessary bookkeeping work to map between native and Java spaces. Due to the amount of this work, invoking a native method from a Java method is expensive. It can be several times as expensive as invoking one Java method from another Java method; it is even more so compared to invoking one native method from another native method.

Furthermore, invoking native method from a Java method perturbs compiler optimizations. For example, consider where a tool takes the Java bytecode for a method in the original program, and inserts a probe into the middle of the bytecode which invokes a native method. In this case, a just-in-time (JIT) compiler will very likely treat that invocation as a barrier to dataflow optimizations such as code motion.

The tool may require the probe to contain native method invocations for a number of reasons. First, the probe may need to acquire information that is impossible to acquire at the Java language level; one example of such information is high resolution clocks (Java only supports millisecond granularity clocks). Second, the probe may need to perform operations which are too inefficient to perform at, the source code level, but which can be performed efficiently at a lower level. Examples of lower-level support include assistance from the compiler, a runtime system, and from a probe-provided native code. A main example of operations too inefficient to perform in Java source code are the filtering criteria described earlier. The filters may be too expensive to implement at the source level. Even though the checks may be cheap at the native level, the native calls themselves are very expensive. Therefore, filtering must be implemented by another mechanism. Thus there is a need for a method to lower perturbation in the inspection process.

SUMMARY OF THE INVENTION

Briefly, according to the invention, a system and method for analyzing the runtime behavior of a program given a set of one or more probes and points for inserting the probes for performing a specified inspection, the method comprises providing a compiler with one or more of the following types of information about each probe: specifying probe's context, its filter criteria, whether it is a fast-path probe, whether it is a timing probe, the probe's guard swing, the probe's context hardness, and the probe's temporal hardness; and compiling the program with the one or more probes and the information.

DESCRIPTION OF THE PREFERRED EMBODIMENT

Figure 1:
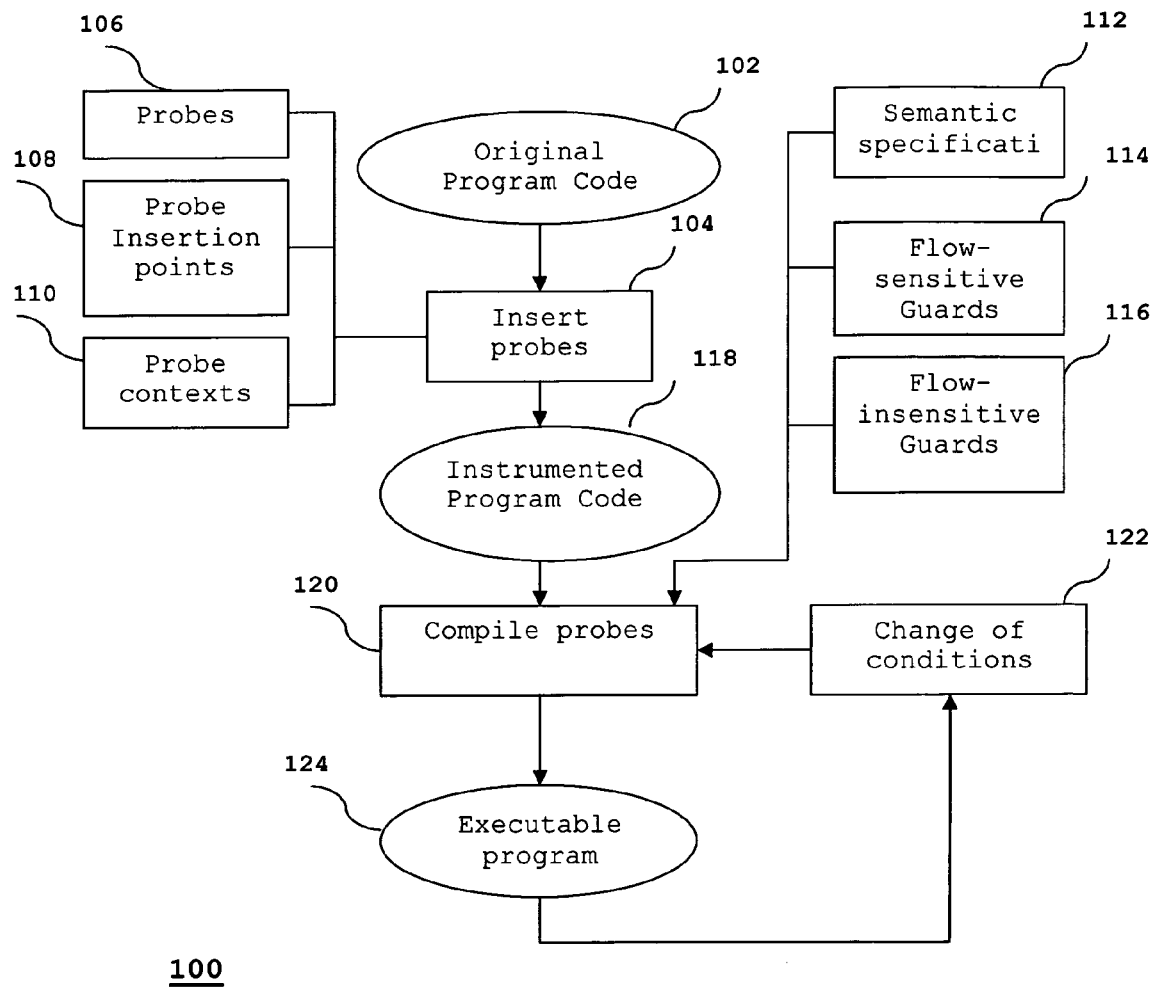
FIG. 1 is a flow chart illustrating the components of a method according to the invention.

Referring to FIG. 1, there is shown a block diagram illustrating a method 100 for inserting probes 106 into an original program 102 according to the invention. Many situations require analysis of the behavior of a program during runtime. Analyses are performed by diagnostic agents called probes 106. These probes 106 perform inspections on the program which can include analyzing the dynamic behavior of a program at certain intervals. Each inspection can verify, aggregate, or record some aspect of the state of the program's runtime at that point in time. While these inspections of the runtime state can be implemented in a number of ways, in an embodiment of the invention, in step 104 the method 100 inserts probes 106 into the program code 102. Each probe 106 is a portion of code that performs the required inspection. The insertion step 102 takes the probes 106, probe insertion points 108, probe contexts 110, semantic specification 112, flow-sensitive guards 114, and flow-insensitive guards 116 as input to produce the instrumented program code 118. Other information about the probes 106 includes the intent and scope, whether the probe is a fast-path probe, and whether the probe is weak, and whether it is a timing probe. Then in step 120 the probes are compiled with any change of conditions 122 to produce executable program code 124. The change of conditions is determined from the result of the examination of the executable program code 124.

Figure 2:
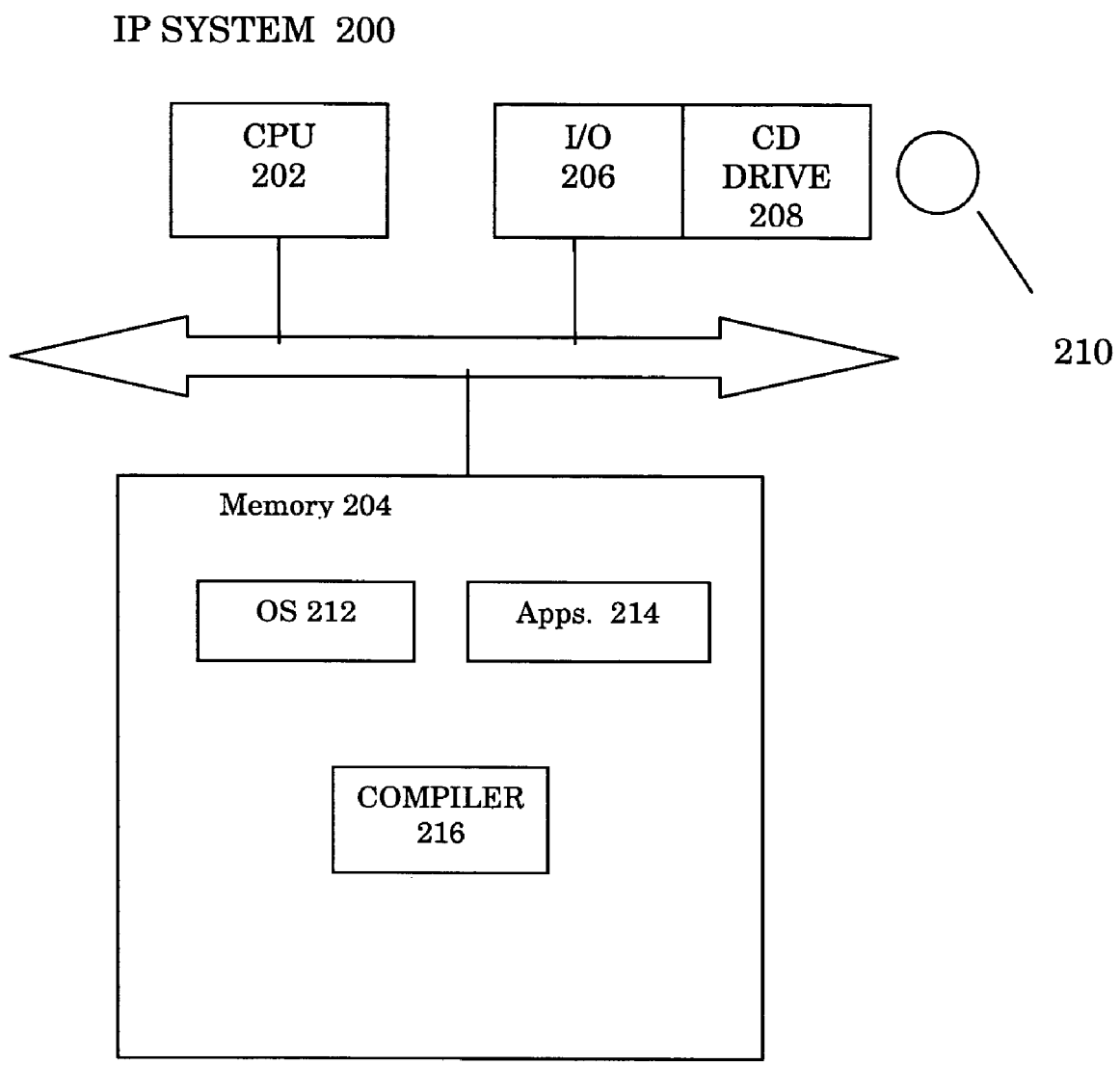
FIG. 2 is a simplified block diagram of an information processing system according to an embodiment of the invention.

Referring to FIG. 2, there is shown an information processing system 200 that has been adapted to perform methods according to the invention. The system 200 comprises a processor (or CPU) 202 for executing program instructions, preferably from a CD ROM 210 that is read by a CD drive 208. The system 200 comprises a I/O subsystem 206 that may also comprise a connection to a network from which program instructions can be downloaded. The system 200 further comprises a memory 204 for storing an operating system such as a UNIX operating system and a plurality of application programs 214. The memory also stores a compiler 216 to be used on instrumented program code 118. The original program 102 to be analyzed can also be introduced to the system 200 by means of the CD ROM drive 208 or received from a network (not shown).

The method 200 iteratively compiles the probes 106 along with the program 102, which compilation driven by a number of provided specifications for the probes (108 through 116). We refer to the item being inspected by a probe as an inspection point 108. For example, an inspection point 108 could be the invocation of a certain method, or the return from that method, the iteration of some loop, or the value of a variable at a point in the program's execution.

The method described here does not depend on a particular form of a program code. For example, the program code can be program source, an intermediate byte code, assembly code, or object code. As long there is the ability to insert the probes into any form of code, the method applies. For example, the ATOM tool, discussed in Amitabh Srivastava and David W. Wall. "A Practical System For Intermodule Code Optimization At Link-Time" *Journal of Programming Languages*, December 1992, performs object code manipulation for the Alpha processor's object code.

We provide an embodiment of the invention which allows for tracing a fine level of detail of Java programs while minimizing the perturbation on the program's execution. While in this embodiment we refer to notions specific to Java, we do not mean to limit the applicability to that language and runtime. The mechanism will be provided a program written in Java, a set of probes 206, and, for each probe, a set of insertion points 208 and contexts 210, and, for each insertion point, the probe filter criteria (214 and 216) and the probe semantic specification 212. We show how, given this information, to insert the probes 104 into the original program code 102, and how the compiler 216 compiles the resulting instrumented program code 118 in such a way that the resulting executable program code 124 operates with low perturbation.

The Probes, Insertion Points, and Contexts

For each probe 106, the user provides an operation to perform and a set of one or more locations 108 at which to insert each probe. The user encodes the operation to perform either as a Java subroutine or as a native subroutine (i.e. one written in C). Each insertion point 108 is a location relative to the existing byte code. For example, a probe may be inserted before or after a certain byte code. Finally, for each probe, the user optionally specifies a context of that probe 110, which is the operation being inspected (such as the invocation of a method, or the iteration of a loop). If not specified, the context of a probe 110 defaults to the entry or exit from the basic block of the insertion point 108, depending on whether the insertion point 108 is closer to the top or bottom of the block.

Probe Filter Criteria

With each insertion point 108, the user declares a set of dynamic conditions with which to guard the execution of the probe 106 at that insertion point 108. There are two types of guards; the first is a flow insensitive guard 116, which determines whether the probe 106 is enabled at that point in time, the other is a flow sensitive guard 114, which determines whether the probe is enabled, given the current context 110 of the insertion point 108.

The flow insensitive guards 116 can be used to inspect the behavior of the original program code 102 for one or many periods of time. They can either enable or disable the probe 106 globally, at all insertion points 108, or can be insertion point 108 specific. For example, if the user is recording the duration of invocations, then it will insert a method enter probe and a method exit probe in those methods it wants to track. Rather than tracing invocation durations for extended durations, the user associates a global flag to control whether this entry/exit recording is enabled. A site-specific flag can be used to dynamically choose subsets to trace. For example, if the user wishes to trigger tracing on the invocation of some method, then it can enabled a site specific guard for that one method (rather than enabling method entry tracking globally, which would result in unnecessary perturbation). Note that flow insensitive guards 114 can be implemented either by inserting checks into the original program code 102, or by recompiling the code when a guard's status changes 122 (to either insert or remove the probe).

Given that a probe's flow insensitive guards 114 are enabled, the user can use a flow sensitive guard 114 to further refine its analysis. An important example of this kind of refinement is to enable probes only within certain threads. Unlike flow insensitive guards 116, this type of guard must be implemented by inserting checks into the original program code 102.

Probe Semantic Specifications

With each probe 106, the user also declares how the compiler 216 and runtime should treat the probe 106 while performing transformations. We group these semantic specifications 112 into four categories: a Java Native Interface usage, a guard swing, context hardness, and temporal hardness. We now describe these specifications 112 in more detail, and provide settings for each. For each of the latter three categories, there is a spectrum of levels, of which those presented here are only a useful sample.

First, the user declares whether the probe 106 uses the Java Native Interface. Note that this is only necessary for probes 106 implemented in native code; for Java implemented probes, this specification can be inferred from the code itself. In contrast, a Java compiler may have difficulty inferring the same from native code; this is especially true for just-in-time or dynamic compilers, where the source code to the native probes is likely not to be available.

Second, guard swing specifies how many insertion points 108 will be affected by a change in guard status. Our current embodiment allows the user to specify a guard swing as either low or high. A low guard swing implies a small change in the number of active or inactive insertion points 108 when the status of the guards changes. Similarly, a high guard swing implies a large change. This includes both flow insensitive 116 and flow sensitive guards 114. For example, a probe intended to trigger the enablement of more widespread tracing typically has a low guard swing, because the number of contexts 110 that compose the triggering criteria is small.

Third, context hardness specifies how to treat the probe insertion point 108 in the face of removal of its context 110. The preferred embodiment allows the user to specify context hardness as either weak or strong; we introduce the denotation of "weak probes" and "strong probes", respectively. A weak probe should not prevent a compiler from removing the context 110 (when, without such a semantic specification, the existence of the inserted probe would have prevented the transformation), and a weak probe, should not remain when the context 110 is removed. For example, if the context of a weak probe 110 is the invocation of a method, and a compiler inlines that method at certain call sites, then the probe 106 should not occur at the inlined sites. A strong probe 106 has the opposite interpretation.

Fourth, temporal hardness specifies the relation between executions of the context 110 and executions of the probe 106 at an insertion point 108. If the compiler 216 and runtime create a one to one correspondence between execution of one and the other, we say that the transformations have preserved WHENEVER temporal hardness is present. If the transformations create an M-to-1 correspondence (with M>1), then we say they preserve IF EVER temporal hardness. The former is a more stringent version of temporal hardness than the latter. More stringent still than WHENEVER semantics would have the transformations also preserve ordering: the probe 106 executes whenever the context 110 does, and always after or before (depending oar how the location of the insertion point 108 relative. to the context 110). We term this SP-WHENEVER, for sequence preserving WHENEVER, temporal hardness. Yet more stringent than SP WHENEVER would have the transformations preserve the exact time at which an insertion point 108 executes: we call this fourth level AT temporal hardness. Our preferred embodiment allows the user to specify AT, WHENEVER, and IF-EVER temporal hardness levels.

Fifth, the user specifies whether the probe is a timing probe. If it is, then the compiler generates code which acquires a high resolution timestamp just prior to invoking the probe, and passes, as an argument, that acquired time to the probe code.

How to Insert a Probe into Byte Code

At each insertion point 108, the user adds a subroutine call to the associated probe 106. Notably, the user does not add any of the dynamic conditioning checks when inserting a probe 104. Instead, the compiler 216 and runtime use the provided, and per insertion point 108 declarations, to decide how to treat the probe 106.

How a Just-In-Time Compiler can Compile the Instrumented Code

Our current embodiment specifies that the just-in-time compiler uses the flow sensitive guard 114, flow insensitive guard 116 and semantic specifications 112 to implement the probes 106. In the process of compiling the code, the Just-In-Time compiler uses the extra information as follows.

First, the Just-In-Time compiler recognizes that it has reached an insertion point 108 by observing a call to one of the specified probes 106. Once it has identified an insertion point 108, it modifies its analyses depending on the probe semantics 112, and finally (if the insertion point 108 remains after any transformations the Just-In-Time compiler performs) it generates code to invoke that probe 106.

Second, the Just-In-Time compiler uses context hardness as follows. If the probe 106 is weak and the context 110 no longer exists, then the Just-In-Time compiler treats that subroutine call as dead code. In addition to reproving the call, this allows the Just-In-Time compiler to reprove any code used only for the subroutine call. For example, if the user inserted a probe 106 which passed in the value of certain local variables as arguments to the probe 106, any byte codes necessary to pass these arguments also becomes dead code. Otherwise, if the probe 106 is weak then the Just-In-Time compiler modifies its analyses (such as dataflow-and thread-analyses) so that existence of the inserted probe 106 doesn't preclude removal of its context 110.

Third, the Just-In-Time compiler uses temporal hardness as follows. For AT probes 106, any analyses will treat the subroutine call as a barrier. Therefore, for example, any code motion transformations will not move code around the probe insertion point 108. For WHENEVER probes, any analyses will treat the subroutine call as having loop carried dependences, but no loop independent dependences. Therefore, any transformations, such as loop hoisting, will ensure that the probe 106 is executed as often as its context 110. For IF EVER probes, any analyses will treat the subroutine call as having a dependence on a computation that is highest in the control dependence graph. Therefore, any transformations are free to move the subroutine call anywhere, as long as it at least once, if there is every an execution path which does executes the context 110.

Fourth, the Just-In-Time compiler has found a location at which to compile in a guarded subroutine call. If the guard swing of the probe 106 is high, then the Just-In-Time compiler implements, as follows, the guards via conditional checks in the code itself. It first creates a new basic block, which initially contains the subroutine call and is linked inline with the basic block in which the subroutine existed in the obvious way. Then, using the same dataflow analysis it would have performed above to remove a the operations leafing up to a weak probe insertion point 108, the Just-In-Time compiler can determine the operations which can be moved within that basic block. Next, the Just-In-Time compiler generates flow insensitive guards 116 and flow sensitive guards 114 for that basic block. The guards first check any flow insensitive global flags, then any flow insensitive call site specific flags, then any flow sensitive flags. If the probe is native, and marked as using Java Native Interface, then the Just-In-Time compiler may need to perform a heavyweight subroutine call; otherwise, it can perform a lightweight one. A heavyweight subroutine call initializes activation records and does other bookkeeping necessary to perform a Java Native Interface call from a non-Java Native Interface environment.

If the guard swing is low, then the Just-In-Time compiler implements, as follows, the flow sensitive guard 114 and the flow insensitive guard 116 via a combination of conditional checks and recompilation. Whenever a method is compiled or recompiled, the Just-In-Time compiler evaluates the flow-insensitive guard 116. If any evaluate to false, then it treats the subroutine call as a non operation, just as it handled weak probes. Next, it handles any context sensitive probes as described in the previous paragraph. Finally, it adds a recompilation handler triggered on the change of any of the context insensitive guards: when any of those conditions change, the Just-In-Time compiler must recompile this method.

Therefore, while there has been described what is presently considered to be the preferred embodiment, it will be understood by those skilled in the art that other modifications can be made within the spirit of the invention.

What is claimed is:

1. A method for analyzing the runtime behavior of a program given a set of one or more probes and points for inserting the probes for performing a specified inspection, the method comprising:
    providing a compiler with one or more semantics about each probe, the semantics selected from the group consisting of:
    specifying the probe's context, its filter criteria, whether it is a fast-path probe, whether it is a timing probe, the probe's guard swing, the probe's context hardness, and the probe's temporal hardness; and
    compiling the program with the one or more probes and the semantics.

2. The method of claim 1, wherein the semantics relate solely to the probe's context.

3. The method of claim 1, wherein the semantics relate solely to the probe's filter criteria.

4. The method of claim 1, wherein the semantics relate solely to whether the probe is a fast-path probe.

5. The method of claim 1, wherein the semantics relate solely to whether the probe is a timing probe.

6. The method of claim 1, wherein the semantics relate solely to the probe's guard swing.

7. The method of claim 1, wherein the semantics relate solely to the probe's context hardness.

8. The method of claim 1 further comprising receiving one or more insertion points from a user indicating where to insert the native probes.

9. The method of claim 1 further comprising receiving an operation from the user encoded as a Java subroutine.

10. The method of claim 9 further comprising receiving an operation from the user encoded as a native subroutine.

11. An information processing system comprising:
    an input/output device for receiving a program to be analyzed, a set of probes to be inserted in the program, and probe semantics relating to the set of probes;
    a processor for inserting the probes; and
    memory for storing the information and the program to be analyzed, wherein the probe semantics are selected from the group consisting of: specifying the probe's context, its filter criteria, whether it is a fast-path probe, whether it is a timing probe, the probe's guard swing, the probe's context hardness, and the probe's temporal hardness.

12. The system of claim 11 wherein the input/output device further comprises a CDROM drive.

13. The system of claim 11 wherein the input/output device further comprises a network interface.

14. The system of claim 13 wherein the memory further comprises a compiler for compiling the program with the one or more probes and the information.

15. A computer readable medium for analyzing the runtime behavior of a program given a set of one or more probes and points for inserting the probes for performing a specified inspection with minimal perturbation comprising instructions for:
    providing a compiler with one or more semantics about each probe, the semantics selected from the group consisting of: specifying the probe's context, its filter criteria, whether it is a fast-path probe, whether it is a timing probe, the probe's guard swing, the probe's context hardness, and the probe's temporal hardness; and
    compiling the program with the one or more probes and the semantics.

16. The computer-readable medium of claim 15 wherein the semantics relate solely to the probe's context.

17. The computer-readable medium of claim 15 wherein the semantics relate solely to the probe's filter criteria.

18. The computer-readable medium of claim 15 wherein the semantics relate solely to whether the probe is a fast-path probe.

19. The computer-readable medium of claim 15 wherein the semantics relate solely to whether the probe is a timing probe.

20. The computer-readable medium of claim 15 wherein the semantics relate solely to the probe's guard swing.

21. The computer-readable medium of claim 15 wherein the semantics relate solely to the probe's context hardness.

* * * * *